United States Patent [19]

Schroeder et al.

[11] 3,972,024

[45] July 27, 1976

[54] PROGRAMMABLE MICROPROCESSOR

[75] Inventors: Franklin T. Schroeder, Exton; John P. McAllister, Wayne, both of Pa.

[73] Assignee: Burroughs Corporation, Detroit, Mich.

[22] Filed: Mar. 27, 1974

[21] Appl. No.: 455,060

[52] U.S. Cl. .............................................. 340/172.5

[51] Int. Cl.² ......................... G06F 9/20; G06F 9/16

[58] Field of Search ....................... 340/172.5; 445/1

[56] References Cited

UNITED STATES PATENTS

| | | | |
|---|---|---|---|
| 3,573,851 | 4/1971 | Watson et al. | 340/172.5 |
| 3,603,936 | 9/1971 | Attwood | 340/172.5 |
| 3,638,199 | 1/1972 | Kolankowsky et al. | 340/172.5 |
| 3,656,123 | 4/1972 | Carnevale et al. | 340/172.5 |
| 3,689,895 | 9/1972 | Kitamura | 340/172.5 |
| 3,696,340 | 10/1972 | Matsushita et al. | 340/172.5 |
| 3,736,567 | 5/1973 | Lotan et al. | 340/172.5 |
| 3,742,457 | 6/1973 | Calle et al. | 340/172.5 |
| 3,745,533 | 7/1973 | Erwin et al. | 340/172.5 |
| 3,766,532 | 10/1973 | Liebel | 340/172.5 |
| 3,766,533 | 10/1973 | Black et al. | 340/172.5 |
| 3,786,434 | 1/1974 | Frye et al. | 340/172.5 |
| 3,786,436 | 7/1974 | Zelinski et al. | 340/172.5 |
| 3,859,636 | 1/1975 | Cook | 340/172.5 |
| 3,916,388 | 10/1975 | Shimp et al. | 340/172.5 |

*Primary Examiner*—Gareth D. Shaw
*Assistant Examiner*—Jan E. Rhoads
*Attorney, Agent, or Firm*—Kevin R. Peterson; Edward J. Feeney, Jr.; Leonard C. Brenner

[57] ABSTRACT

An improved microinstruction memory addressing method and apparatus within a serial-bit microinstruction processor incorporating internal, serial-byte transfer, is provided by addition to and alteration of memory control circuitry wherein the resulting permissible microinstruction set for controlling the processor may be expanded to include a CALL, GO-TO and EXECUTE operations, thus increasing the programmatic capabilities in the processor. The micro-code needed to define more complicated program operations, and thus the time used to perform these operations, may therefore be greatly reduced. Changes may also be made in existing timing circuitry.

5 Claims, 17 Drawing Figures

INSTRUCTION REGISTER BITS

| 1 | 2 | 3 | 4 | 5 | 6 | 7 | 8 | 9 | 10 | 11 | 12 |
|---|---|---|---|---|---|---|---|---|---|---|---|
| X | | OP +Y | | | | DEST. | | | | 0 | 1 |

| X SELECT | | OPERATION AND Y SELECT@ | | DESTINATION | COMMAND CODE |
|---|---|---|---|---|---|
| 00 | 0 | 0000 | X+B+1 | 0000 | B |
| 00 | A1 | 0001 | X+B | 0001 | A1 |
| 10 | A2 | *0010 | X+Z+1 | 0010 | A2 |
| 11 | A3 | *0011 | X+Z | 0011 | A3 |
| | | 0100 | X EQV B($XB \vee \bar{X}\bar{B}$) | 0100 | OUT 0 |
| | | 0101 | X XOR B($X\bar{B} \vee \bar{X}B$) | 0101 | OUT 1 |
| | | 0110 | X-B(X+B+1) | 0110 | OUT 2 |
| | | 0111 | X-B-1(X+B) | 0111 | AMPCR ,OUT 3 |
| | | 1000 | X NOR B($\overline{X \vee B}$) | #1000 | B , BEX 0 |
| | | 1001 | X NAN B($\overline{XB}$) | #1001 | A1, BEX 1 |
| | | *1010 | X NOR Z($\overline{X \vee Z}$) | #1010 | A2, BEX 2 |
| | | *1011 | X NAN Z($\overline{XZ}$) | #1011 | A3, BEX 3 |
| | | 1100 | X OR B($X \vee B$) | %1100 | B S |
| | | 1101 | X AND B (XB) | %1101 | A1 S |
| | | 1110 | X RIM B ($X \vee \bar{B}$) | %1110 | A2 S |
| | | 1111 | X NIM B ($X\bar{B}$) | 1111 | A3, AMCPR |

NOTE:

* – Z=AMPCR. WHEN AMPCR IS NOT SELECTED AS A DESTINATION. THEN AMPCR WILL BE "ZERO" (I.E., Z=0) IN ALL OPERATIONS AS A Y-SELECT INPUT.

@ – Y-SELECT=B OR Z AS INDICATED.

– "BEX" INDICATES SERIAL TRANSFER FROM EXTERNAL REGISTER TO B-REGISTER WHILE ADDER TRANSFERS TO OTHER SPECIFIED REGISTER (IF B, THEN 2 INPUTS ARE ORED).

% – "S" INDICATES A ONE-BIT RIGHT SHIFT OF THE DESTINATION REGISTER END OFF, WITH THE MSB BEING FILLED BY THE ADDER OUTPUT.

*Fig. 11*

LITERAL INSTRUCTIONS

| 1 – 8 | 9 | 10 | 11 | 12 |
|---|---|---|---|---|
| | OP CODE | | | |
| LIT. TO DEV (PORT 0) | 0 | 0 | 0 | 0 |
| LIT. TO DEV (PORT 1) | 0 | 1 | 0 | 0 |
| LIT. TO DEV (PORT 2) | 1 | 0 | 0 | 0 |
| LIT. TO DEV (PORT 3) | 1 | 1 | 0 | 0 |
| SPARE | 0 | 0 | 1 | 0 |
| SPARE | 1 | 0 | 1 | 0 |
| CALL (MPCR+1→AMPCR, LIT & IR→MPCR) | 0 | 1 | 1 | 0 |
| GOTO (LIT & IR→MPCR, AMPCR IS UNCHANGED) | 1 | 1 | 1 | 0 |
| LIT. TO IR (MS ADR BYTE FOR 16 BIT GOTO OR CALL) | 0 | 0 | 1 | 1 |
| LIT TO B | 1 | 0 | 1 | 1 |

CONDITION TEST INSTRUCTION

| 1 – 3 | 4 – 5 | 6 – 7 | 8 – 9 | 10 | 11 | 12 |
|---|---|---|---|---|---|---|
| | | | | OP CODE | | |
| CONDITION SELECT | SET CONDITION | TRUE SUCCESSOR | FALSE SUCCESSOR | 1 | 1 | 1 |
| 000 MST | 00 SET LC1 | 00 STEP | 00 STEP | | | |
| 001 AOV | 01 SET LC2 | 01 JUMP | 01 JUMP | | | |
| 010 LST | 10 SET LC3 | 10 SKIP | 10 SKIP | | | |
| 011 ABT | 11 NONE | 11 EXEC | 11 EXEC | | | |
| 100 LC1 | | | | | | |
| 101 LC2 | | | | | | |
| 110 LC3 | | | | | | |
| 111 EXT | | | | | | |

LOGIC UNIT INSTRUCTION

| 1 – 2 | 3 – 6 | 7 – 10 | 11 | 12 |
|---|---|---|---|---|
| | | | OP CODE | |
| X SELECT | OPERATION AND Y SELECT | DEST. SELECT | 0 | 1 |
| 00 0 | 0000 X+B+1 | 0000 B | | |
| 01 A1 | 0001 X+B | 0001 A1 | | |
| 10 A2 | 0010* X+Z+1 | 0010 A2 | | |
| 11 A3 | 0001* X+Z | 0011 A3 | | |
| | 0100 X EQV B(XB v $\overline{XB}$) | 0100 OUT 0 | | |
| | 0101 X EOR B(X$\bar{B}$ v $\bar{X}$B) | 0101 OUT 1 | | |
| | 0110 X−B (X+$\bar{B}$+1) | 0110 OUT 2 | | |
| | 0111 X−B−1 (X+$\bar{B}$) | 0111 AMPCR, OUT 3 | | |
| | 1000 X NOR B($\overline{X \vee B}$) | 1000 B, BEX | | |
| | 1001 X NAN B($\overline{XB}$) | 1001 A1, BEX | | |
| | 1010* X NOR Z($\overline{X \vee Z}$) | 1010 A2, BEX | | |
| | 1011* X NAN Z($\overline{XZ}$) | 1011 A3, BEX | | |
| | 1100 X OR B (X v B) | 1100 B S | | |
| | 1101 X AND B(XB) | 1101 A1 S | | |
| | 1110 X RIM B(X v $\bar{B}$) | 1110 A2 S | | |
| | 1111 X NIM B(X$\bar{B}$) | 1111 A3, AMPCR | | |
| | *WHEN Z IS NOT SELECTED AS DESTINATION, Z=0 | | | |

Fig. 12

PROGRAMMABLE MICROPROCESSOR

BACKGROUND OF THE INVENTION

The present invention relates to a digital computer and more particularly to a microprogrammable digital-processor, memory, logic, and control and addressing structure, which may be implemented in TTL logic or as a LSI (large scale integration) chip. Moreover, this invention particularly relates to an apparatus and method for handling microinstruction memory addressing in such a microprogram processor ro "routine", "subroutine", and "iterative-loop" programmatic operations.

Microinstruction processors in general may have strings of microinstructions stored in micromemory to form programs which control the sequence of information transfer within the process. Typically, a higher level operator command is implemented by a sequence of microinstructions. Micromemory addressing or microinstruction address accessing is of necessity a function of the hardware design of the processor.

Usually the micromemory is addressed by a program count register. This register, typically, is incremented after each operation to access each succeeding address in a microinstruction string. However, as the program operations to be performed become more complex, i.e., the inclusion of subroutines and iterative loops, micromemory addressing becomes more complex.

The subject improvement is to a particular type of microprogrammable unit as embodied in the teachings of Faber in patent application U.S. Ser. No. 307,863, filed Nov. 20, 1972 and assigned to the assignee of the present application. The programmable unit disclosed therein is a self-contained serial-bit by byte processor employing a soft machine architecture through microprogramming. An instruction set, at the microprogram level is provided for controlling the specific circuitry of the processor in executing basic computer operations. Essentially, the specific circuitry represents minimally committed logic or hardware which becomes committed to a specific task by control signals originating in the instruction set. Logic, control, and addressing functions are performed by circuitry which includes only those gates, registers, drivers, and related logic, which are necessary to implement the basic operations.

Such a processing unit may be comprised of five functional parts: (1) a logic unit which performs shifting, arithmetic and logic functions; (2) a microprogram memory which stores both literals and control words; (3) a memory control unit which provides the registers microprogram memory addressing; (4) a control unit which provides timing and conditional control, successor determination and instruction decoding; and (5) an external interface.

In the microprocessor, cited above, a microprogram memory (MPM) is addressed by a memory program count register (MPCR). Feeding this (MPCR) register is an alternate memory program count register (AMPCR). The AMPCR receives instructions from microprogram memory as well as from other registers within the processor.

This parent invention has a fundamental instruction set which is sufficient to perform most programmatic operations. More, but not all, sophisticated microprogram manipulations are performed by concatenation of the basic instructions. Included in the basic instruction set are STEP, SKIP, SAVE, and JUMP instructions. STEP initiates a step to the next instruction in sequence from a previous MPCR address. SKIP initiates a skip to the second next instruction in sequence from a previous MPCR address. SAVE initiates a step and a save of the current MPCR address in AMPCR. JUMP initiates a transfer of control to the AMPCR address. However, with the existing control logic the saving of a return address until a subroutine is performed for a program branch and return, or a loop within a subroutine and return, or an execution of a variable instruction external to a subroutine as part of the execution of that subroutine is not readily possible. Such operations as branch to a subroutine and return, loop within a subroutine and return and execution of an instruction external to subroutine canot be easily handled.

It is therefore an object of this invention to provide a method of data manipulation within a serial-bit by byte processor and the timing apparatus to implement this method to supply direct CALL microprogram capability.

An additional object of the invention is to similarly provide a direct GO-TO microprogram capability which does not alter the previous memory address.

Similarly, a further object of this invention is to provide an external EXECUTE command, microprogram capability.

The parent invention operates on a nine pulse operation period, the length of time needed to perform the longest arithmetic operation. The processor uses nine pulses to implement each instruction regardless of the length of time actually needed to perform the particular operation.

It is desirable to have the processor operate at the faster rate. Therefore, a further object of this invention is to provide an apparatus for adjusting the implementation period of microinstructions and for adjusting shift register lengths.

SUMMARY OF THE INVENTION

An improved serial-bit microprogrammable processor wherein the objectives of this invention may be realized by the mechanization of programmatic CALL, GO-TO and EXECUTE operations into the machine's basic instruction capability. Typically, timing and control circuitry may be introduced into system hardware to alter the operation of the processor microprogram memory addressing (MPCR) circuitry, i.e., the operation of a memory program count register (MPCR) and an alternate memory program count register (AMPCR).

Decoders may receive the coded programmatic CALL, GO-TO and EXECUTE instructions, for decoding the specific instruction to enable logic circuitry to control the transfer and manipulation of instruction addresses between MPCR, AMPCR and microprogram memory.

A CALL instruction may cause the new address, for example a subroutine address, to be loaded from microprogram memory into AMPCR and then into MPCR while at the same time the preceeding address of MPCR is incremented and placed into AMPCR as a return address.

A GO-TO instruction may cause the address in AMPCR to be transferred into MPCR while the new address is transferred into AMPCR. The addresses in AMPCR and MPCR are then swapped so that the new address is entered into MPCR while maintaining the original AMPCR address in AMPCR.

An EXECUTE instruction may perform the instruction addressed by AMPCR via an AMPCR-MPCR double swap, whereupon both the AMPCR and MPCR are incremented.

Instruction implementation time for nonarithmetic instructions may be reduced to the time actually needed for implementation by generating a last pulse or end of operation pulse, which terminates the instruction, at a predetermined time as decoded from the instruction format.

DESCRIPTION OF THE DRAWINGS

The features of this invention will become more fully apparent from the following detailed description, attached claims and accompanying drawings in which like characters refer to like parts and in which:

FIG. 11 is a graphic representation of the improved instruction set for the processor.

FIG. 12 is a graphic detailed representation of the instruction set.

DETAILED DESCRIPTION OF INVENTION

Figure 1:
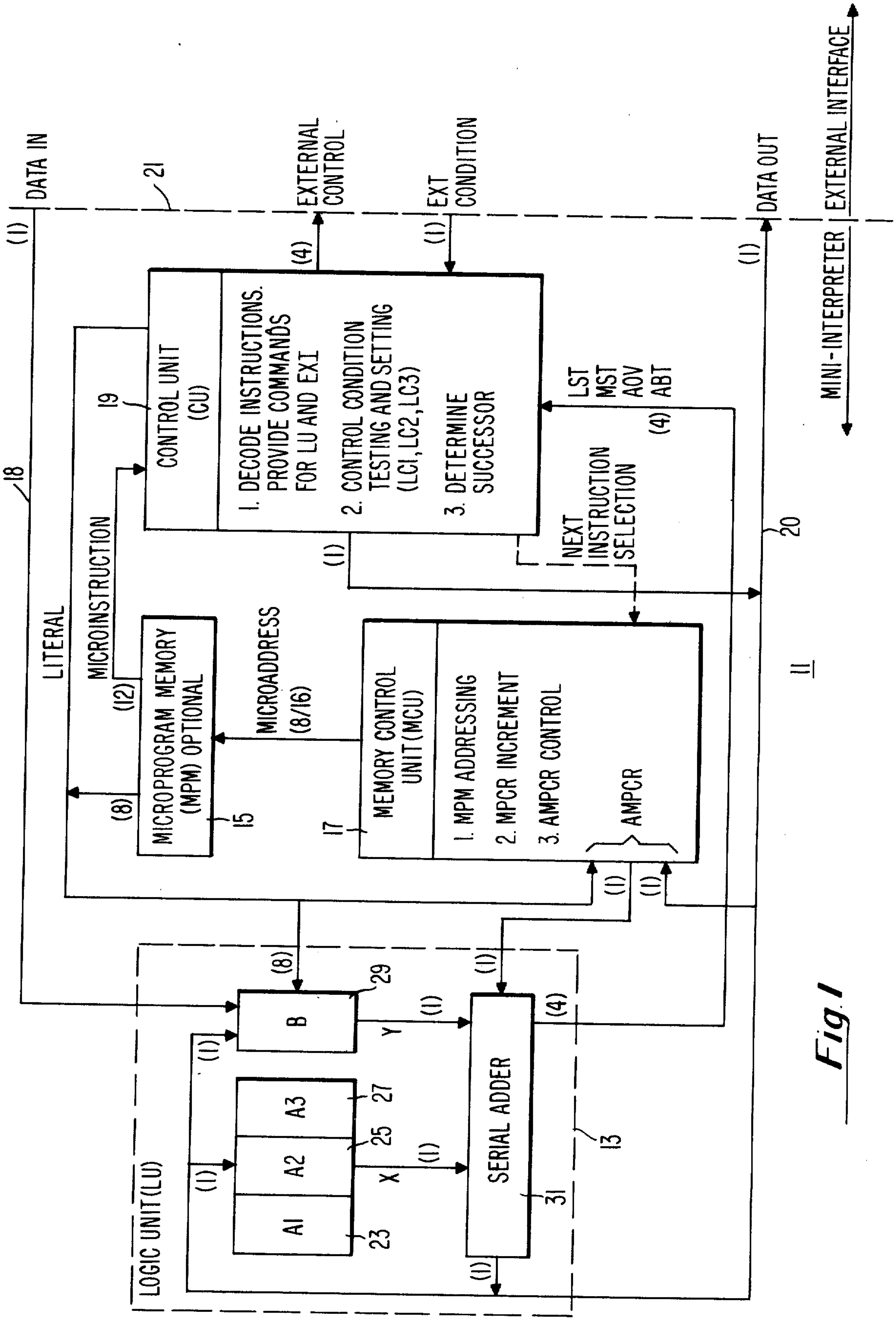
FIG. 1 is a general block diagram of the processor.

The instant invention is an improvement made to a microprogrammable processing system comprising a processing unit 11 (FIG. 1). Unit 11 includes a logic unit 13 (LU) which performs the shifting and arithmetic or logic functions required as well as providing scratch pad memory. A microprogram memory 15 (MPM) is connected to LU 13 which holds microprogram sequences, some words of which have lierals, others have specific controls, specified by the microprogrammer. A memory control unit 17 (MCU) accesses MPM 15 by providing the registers for microprogram memory 15 addressing. A control unit 19 (CU) is connected to all of the other units and provides timing and conditional control, successor (next instruction) determination and instruction decoding. An external interface 21 (EXI) is connected via data busses 18, 20 to LU 13 and CU 19.

Figure 2:
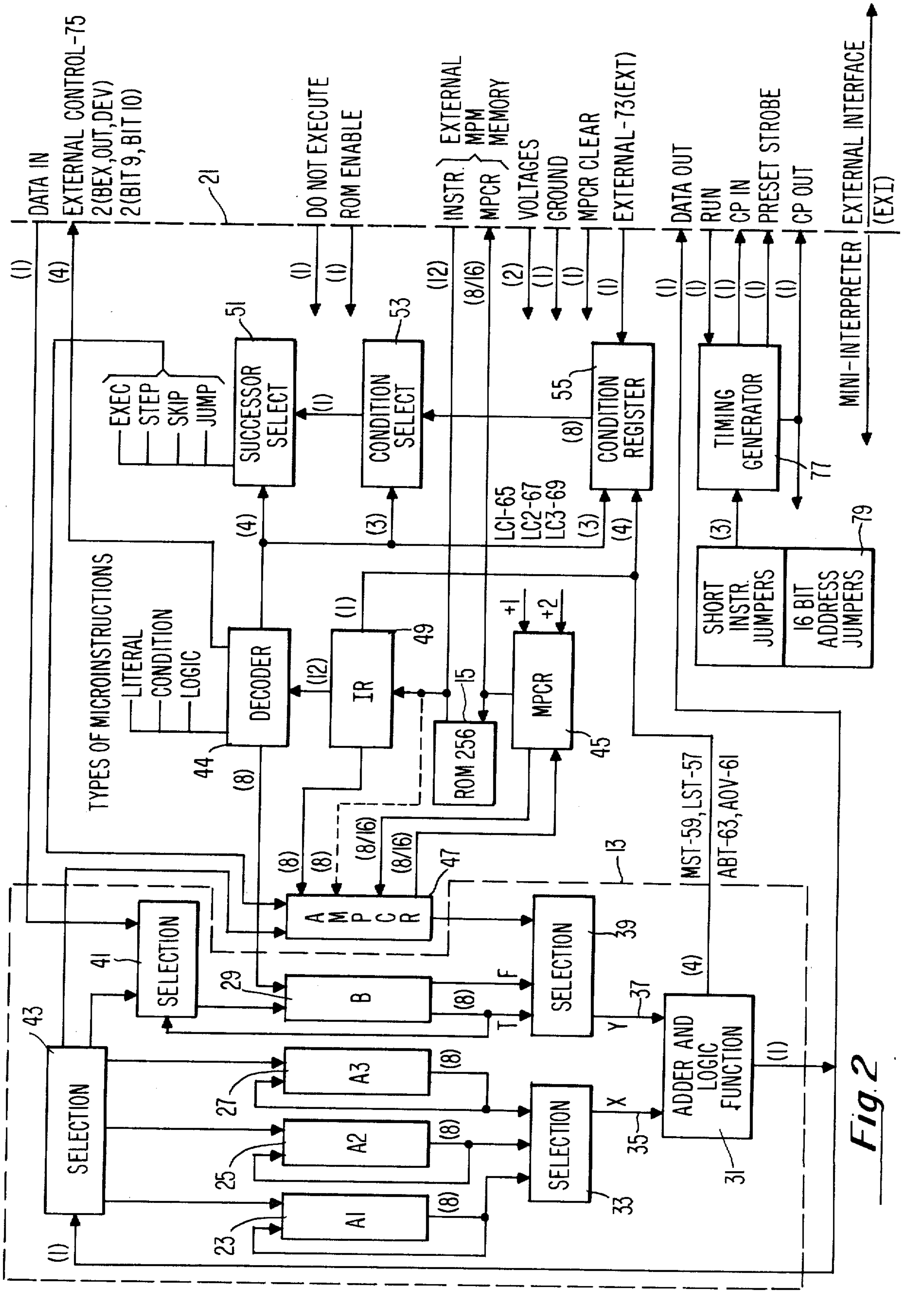
FIG. 2 is a more detailed general purpose block diagram of the processor.

In the preferred embodiment, the logic unit 13 is comprises of three 8-bit recirculating shift registers 23, 25, and 27 connected in parallel and denominated registers A1, A2 and A3, respectively, an 8-bit recirculating shift register 29, denominated the B register, and a serial adder 31, with inputs from B register 29 and A registers 23, 25, 27, and related gating (see FIG. 2). A registers 23, 25, 27 and B register 29 are recirculating shift registers so that information can be transferred into the adder 31 without changing the contents of the respective input register. Further functions of the processor as illustrated in this FIG. 1 will be brought out in the discussion below.

A registers 23, 25 and 27 are functionally identical and may be used to temporarily store data within the logic unit 13. A selection gate network 33 (FIG. 2) permits the contents of any of A registers 23, 25 or 27 to be loaded as one input, denominated the X input 35 of adder 31.

B register 29 is the primary interface into the processor. Data from external sources is entered via data interface 21 and DATA-IN bus 18. The B register 29 (FIG. 2) also serves as a second, or Y, input 37 via a selection network 39 to the adder 31, and collects certain side effects of arithmetic operations. A selection network 41 selects the input to B register 29 from DATA IN, external interface 21, the output of adder 31 via a selection network 43 or a recirculating feedback loop of the "true" contents of the B register 29 from its "true" output. Selection network 43 also permits the output of adder 31 to be fed to A registers 23, 25, 27. In addition, literal values which are decoded from certain microinstructions stored in microprogram memory 15 are fed directly to the B register 29 from a microinstruction decoder 44. As implied above, B register 29 has a true-false output which may be selected to be fed as the Y input 37 of adder 31 by the selection network 39. The purpose is to provide adder 31 with either the true value or the one's complement of the value in B register 29.

Adder 31 is a conventional type serial adder as known in the art.

Microprogram memory 15, as shown also in FIG. 1, is a 256 word 12 bit read-only memory which may optionally be included in the processor hardware configuration or which may be located externally to the processor and accessed via external interface 21. In this latter case an external memory can be expanded to a 65k word size.

Memory control unit (MCU) 17 (FIG. 2) comprises two 8-bit registers, i.e., a microprogram count register 45 (MPCR) and an alternate microprogram count register 47 (AMPCR). MPCR 45 is an 8-bit counter which can be incremented by one or two and is used to address MPM 15 (select each instruction from microprogram memory 15). MPCR 45 may easily be expanded to 12 or 16 bits by the substitution of a 12 or 16 bit counter for the 8-bit counter.

AMPCR 47 can hold an alternate address which is needed for microprogram manipulation. When not required for this purpose, AMPCR 47 can be used by the logic unit 13 as a scratch pad register. The contents of AMPCR 47 can be fed to adder 31 as its Y input 37 via selection network 39 or can be clocked directly into MPCR 45. AMPCR 47 can be loaded by the output from adder 31 via selection logic 43, or from MPCR 45 or from microprogram memory 15 (MPM) or from an instruction register 49 which is tied to the output of microprogram memory 15. When more than 8 bits are to be transferred into AMPCR 47 they may be concatenated with the use of instruction register 49.

The programmable processing unit 11 requires a source of microprogram instructions to define the operation of the processing unit. This source is provided by microprogram memory 15 or external microprogram memory which can either be a RAM or ROM memory. Memory 15 is a read-only memory (ROM) that contains the program defining the processing unit's function when the ROM enable line is true. ROM enable line select enables the instruction source to be from the internal memory 15 in the presence of a true bit, and from the external source in the presence of a false bit. In any event the program stored in either internal memory 15 or external memory characterizes the processing unit 11 to perform specific tasks in an optimum manner.

Presently, for purposes of discussion, only a ROM memory will be considered. In the preferred embodiment, microprogram memory 15 is comprised of 256 words, each 12 bits in length. The memory 15, contains only executable instructions and cannot be changed under program control. Each microinstruction which comprises the microprogram stored in microprogram memory 15 is 12-bits in length and is decoded by the decoder 44 in control unit 19. The 12-bits of each instruction are decoded into one of four types, namely (1) literal, (2) condition, (3) logic and (4) external. A more thorough discussion of these four instruction types will be described in detail later.

Control unit 19 (FIG. 2) includes a microinstruction decoder 44, successor (or next instruction) determination logic 51, condition selection logic 53, and a condition register 55. The successor detemination logic 51, the condition selection logic 53 and the condition register 55 are activated by the output of the microinstruction decoder 44. In addion, the adder 31 feeds four condition bits to the condition register 55, namely the least significant bit true (LST) condition 57, the most significant bit true (MST) condition 59, the adder overflow bit (AOV) 61, and an indicator bit (ABT) 63 (if all bits of the adder output are true 1's). The successor determination logic 51 determines whether to use the contents of the MPCR, register 45, incremented by 1 or by 2, or to use the contents of AMPCR, register 47 for addressing the next instruction stored in microprogram memory 15. Additionally, condition register 55 feeds 8 bits to condition select 53 which in turn selects one bit to successor select 51.

The condition register 52 stores three resettable local condition bits (LC1 bit 65, LC2 bit 67 and LC3 bit 69, respectively), and selects one of 8 condition bits (the 4 adder condition bits, MST bit 59, LST bit 57, AOV bit 61 and ABT bit 63; an external condition bit EXT 71; and the three local condition bits LC1, LC2 and LC3 stored in condition register 55).

External interface 21 (FIG. 2) connects the programmable unit 11 with external elements related to a multiprocessing system. This connection is synchronized by one internally generted clock train available to aid in performing 8-bit serial transfers into and out of programming unit 11. An external asynchronous input EXT 73 (see FIG. 2) to condition register 55 is available for signalling from the external environment in the form of the EXT condition bit 71, while the four external control lines 75, from decoder 45 are utilized to control the use of external registers.

Timing circuitry 77 (FIG. 2), including a hexadecimal counter, is interconnected to all components and in addition to generating basic clock pulses generates control pulses for information transfers within the system.

Short-instruction jumpers 79, which may be implemented as decoder logic or as manually fixable counters, determine the operation period of each instruction by determining an end-of-period pulse or last-pulse at an appropriate time for the various instructions. Short instructions are implemented in shorter operation periods.

Memory control unit 17 controls the addressing of microprogram memory 15 for the addressing of microinstructions to be executed. This control unit 17 includes the microprogram counter register 45 (MPCR), which is used to address instruction locations within the memory 15, and the alternate program counter register 47 (AMPCR), which is used to store new addresses for feeding MPCR 45. Timing circuitry 77 generates and gates timing pulses throughout the system to control the interchange of information. Control unit 19 performs condition selection and testing, successor determination, and instruction register and decoding.

It is the interaction of the components within these units (memory control 17, memory 15, timing 77 and control unit 19) which permits the manipulation of the microinstructions stored and fetched from memory 15 and thus the implementation of microprograms containing program CALL, GO-TO and EXECUTE instructions.

With the existing timing and control apparatus associated with micromemory addressing in the parent invention, the parent apparatus possesses a limited capability in the implementation of certain programmatic operations such as subroutine CALL, GO-TO and EXECUTE which each require the shifting and temporary storage of return addresses in their implementation. The ability to directly handle these operations greatly decreases the total number of program steps required by the processor.

As part of the hardware mechanization decoders are needed to decode each new instruction calling for a CALL, GO-TO, and EXECUTE so that this new code can be included into the microinstruction set. Timing and control logic is needed to perform each new operation decoded.

Processor capabilities may also be increased with the addition of external device registers, a 16 bit microprogram address size and a variable microprogram instruction length.

The instant improvement invention provides these capabilities by manipulating information within the hardware structure.

Figure 3A:
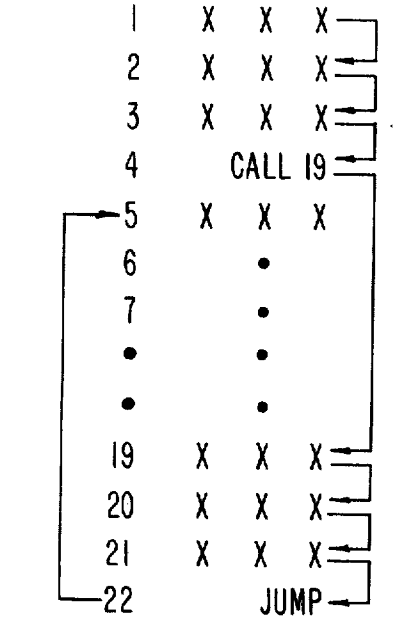
FIG. 3*a*, 3*b*, and 3*c*, are graphic representations of programmatic operations enabled by the improvement.

FIGS. 3*a*, *b* and *c* are graphic illustrations of the three programmatic operations which are added to the processor by the instant invention.

FIG. 3*a* illustrates a subroutine CALL and return to the main routine. Implementation of this operation can be as follows. Beginning with the first instruction the current memory address is stored in MPCR 45. Processor 11 performs each instruction in the program in a sequential manner. After each operation, the MPCR 45 is incremented by one so that the next instruction in the string may be implemented. When a CALL instruction (instruction 4) is read from memory and decoded, the new or CALLED address (instruction 19) is stored in the MPCR 45. Thus microprogram operation automatically jumps to the new or subroutine address and begins implementing subroutine microinstructions in sequential order. Concurrently, the previous MPCR 45 address is incremented by 1 and stored in the AMPCR 47 to be loaded into MPCR 45 when a jump instruction (instruction 22) signifying a return to the main routine is decoded. In this manner implementation of the main routine is continued after the subroutine is performed.

Figure 3B:
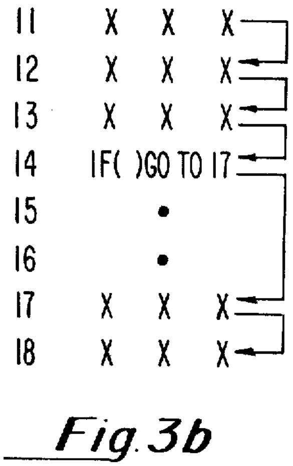

FIG. 3*b* is an illustration of a GO-TO operation wherein the instructions in a microstring are implemented sequentially until the GO-TO (instruction 14) defining a new address is read and decoded from memory. Since the program wishes to begin execution at this new instruction this new address must be moved into MPCR 45 without disturbing a return address which happens to be resident in AMPCR 47.

Figure 3C:
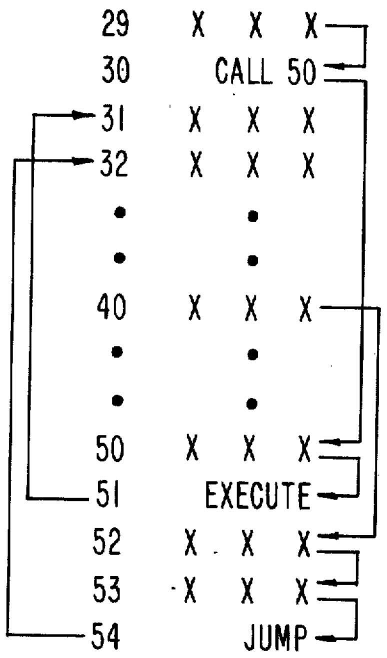

The programmatic EXECUTE is illustrated in FIG. 3. The EXECUTE instruction may appear in a routine or in a subroutine as shown in FIG. 3*c*. The CALL instruction (instruction 30) calls the subroutine (instruction 50 etc.)

When the execute instruction is encountered the program will perform one instruction (specified by AMPCAR 47) out of the normal incrementing sequence. The EXECUTE operation then requires two instruction periods for completion. The first instruction period will (1) increment MPCR 45 and then (2) swap the contents of AMPCR 47 and MPCR 45. The second instruction period will (3) perform the instruction now addressed by MPCR 45 (originally the AMPCR 47) and (4) again increment MPCR 45 and (5) swap the contents of AMPCR 47 and MPCR 45. In summary, an execute will perform the instruction specified by AMPCR 47 and increment both AMPCR 47 and MPCR 45.

To better comprehend the manipulation of information within the processor needed to provide the above-discussed programmatic capabilities, a discussion of the operation memory control unit 17 and the control unit 19 is in order.

Figure 4:
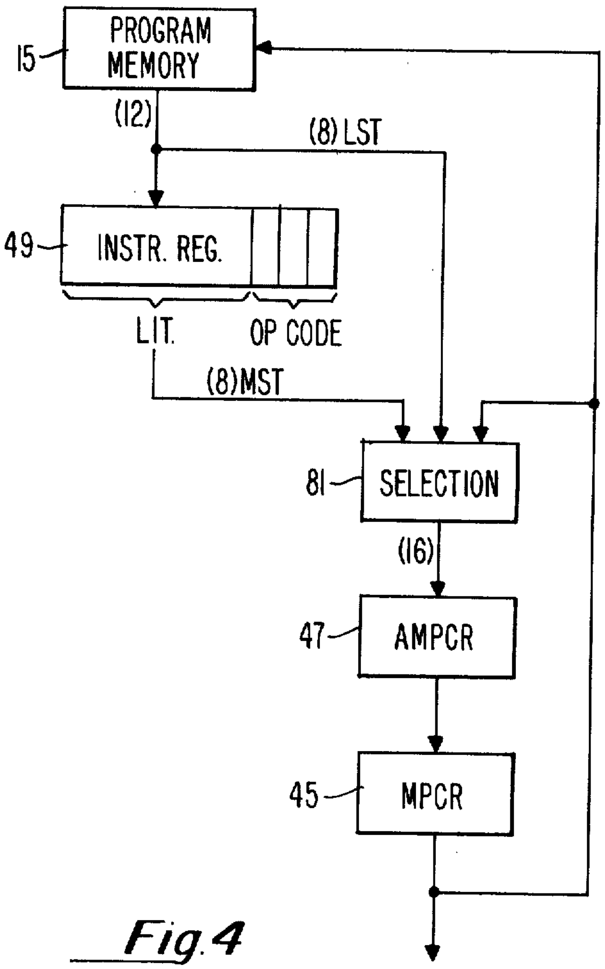
FIG. 4 is a block diagram of the microprogram memory addressing circuitry.

FIG. 4 is a block diagram showing the relationship of the memory control 17 to program memory 15. If the system is operating with 16 bit instructions the literal is loaded in two parts. The most significant 8 bits are first entered into the instruction register 49 from memory 15 and then are concatenated through selection logic 81 with the 8 least significant bits. If the system is operating with 8 bit instruction words this concatenation is not necessary. Selection logic 81 includes a ganged "and"-gate, "or"-gate circuit with respective "and"-gates being enabled to pass selective signals.

Figure 5:
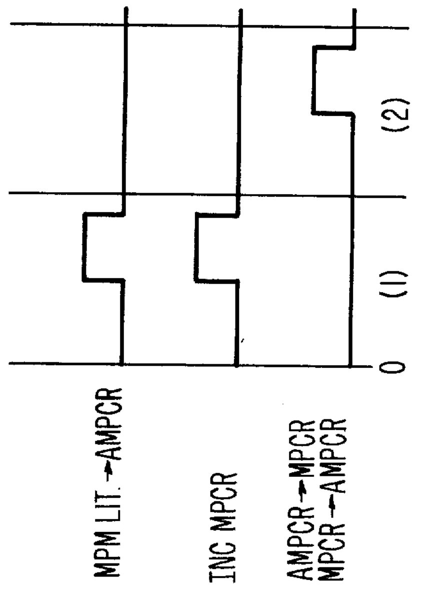
FIG. 5 is a timing diagram for a CALL operation.

The CALL operation is an improvement over the SAVE operation of the parent processor. In this parent machine, SAVE initiated an (*a*) increment of MPCR 45 and (*b*) transfer of the incremented MPCR 45 value into AMPCR. 47. In the instant invention, (FIG. 4) a CALL initiates an (1) increment of MPCR 45 and (2) transfer of the incremented MPCR 45 value into AMPCR 47 and also (3) replacing the incremented content of MPCR 45 with a new address obtained from program memory 15. A timing diagram of the CALL operation (FIG. 5) shows the following steps (1) increment MPCR 45 and simultaneously load a new address (literal) from MPM 15 to AMPCR 45 (2) simultaneously transfer the contents of MPCR 45 to AMPCR 47 and the contents of AMPCR 47 to MPCR 45 (swapping contents). Having completed this sequence of operations, the new or subroutine location then resides in MPCR 45 and the return address resides in AMPCR 47.

Figure 6:
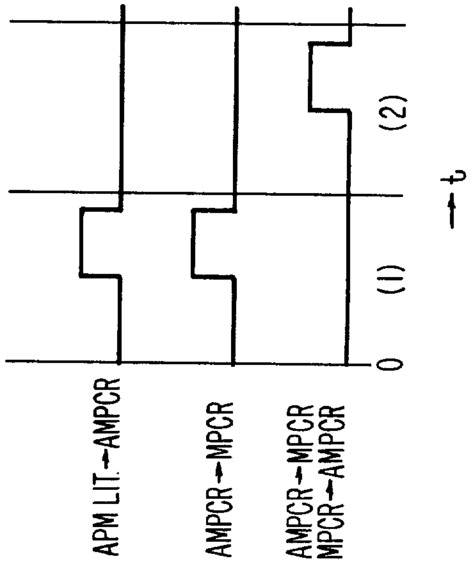
FIG. 6 is a timing diagram for a GO-TO operation.

The GO-TO operation is an improvement to the existing JUMP operation in the processor which loaded both AMPCR 47 and MPCR 45 thus destroying the contents of AMPCR 47. This destroys the old or return address. Unlike the old operations, the new GO-TO command initiates (1) loading of AMPCR 47 value into MPCR 45 and a loading of a new address from MPM 15 into AMPCR 47 (FIG. 4), and (2) swapping of the contents of AMPCR 47 and MPCR 45. In this manner the new GO-TO address is entered into MPCR 45 while the AMPCR 47 address is maintained or saved. FIG. 6 shows the timing sequence as discussed.

Figure 7:
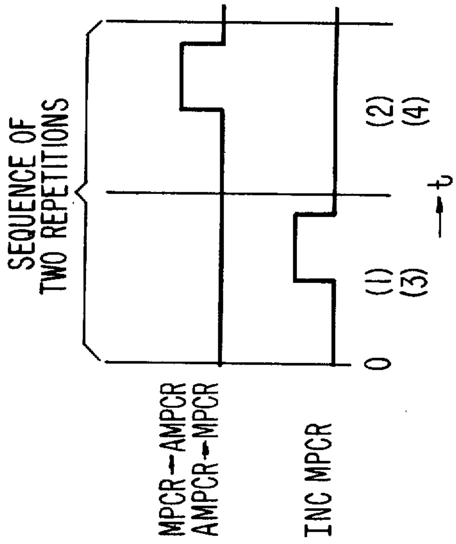
FIG. 7 is a timing diagram for an EXECUTE operation.

The EXECUTE instruction or operation permits the implementation of an AMPCR 47 address for one instruction and then returns MPM 15 address control to the address previously stored in MPCR 45, incremented by one. Address values are manipulated between MPM 15, AMPCR 47 and MPCR 45 (FIG. 4) in accordance with the timing diagram of FIG. 7 as follows: (1) increment MPCR 45 (2) swap contents of AMPCR 47 and MPCR 45 (3) increment MPCR 45 and (4) swap the contents of AMPCR 47 and MPCR 45. The EXECUTE instruction therefore permits the performance of an instruction external to the subroutine as specified by AMPCR 47 and then a return to the next instruction in that subroutine. (Note, the address of AMPCR 47 was incremented, for specifying the succeeding instruction, while residing in MPCR 45.)

The transfer of information to and between the memory control unit 17 registers 45, and 47 is part of, and subject to the operation of the entire processor.

It is self evident that the information transfer concerned within the instant invention must occur within a processor operating cycle. How these operations are implemented in detail is as follows.

A processor operation period is nine clock pulses long. The first pulse of the chain is a preset pulse. The next eight pulses are function pulses, the last one of which is called "last pulse".

The instruction register 49, FIG. 2, is a 12-bit register and is loaded with the instruction data read from MPM 15. The instruction register contains the instruction currently being performed while the next instruction is being fetched from MPM 15, thus providing an execute-fetch overlap feature, i.e., for instruction execution, while the succeeding instruction is read or fetched from memory 15.

The instruction decoding logic 45 decodes the contents of the instruction register 49 in preparation for instruction execution. Instruction decoding is accomplished in the first clock period following the instruction register "load".

Figure 10:
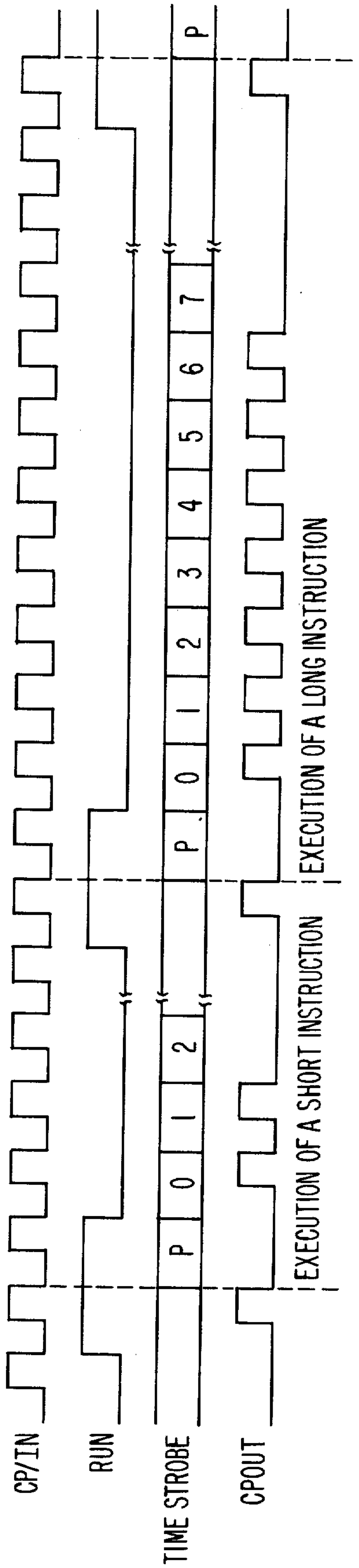
FIG. 10 is a timing analysis of single instruction mode.
Figure 8:
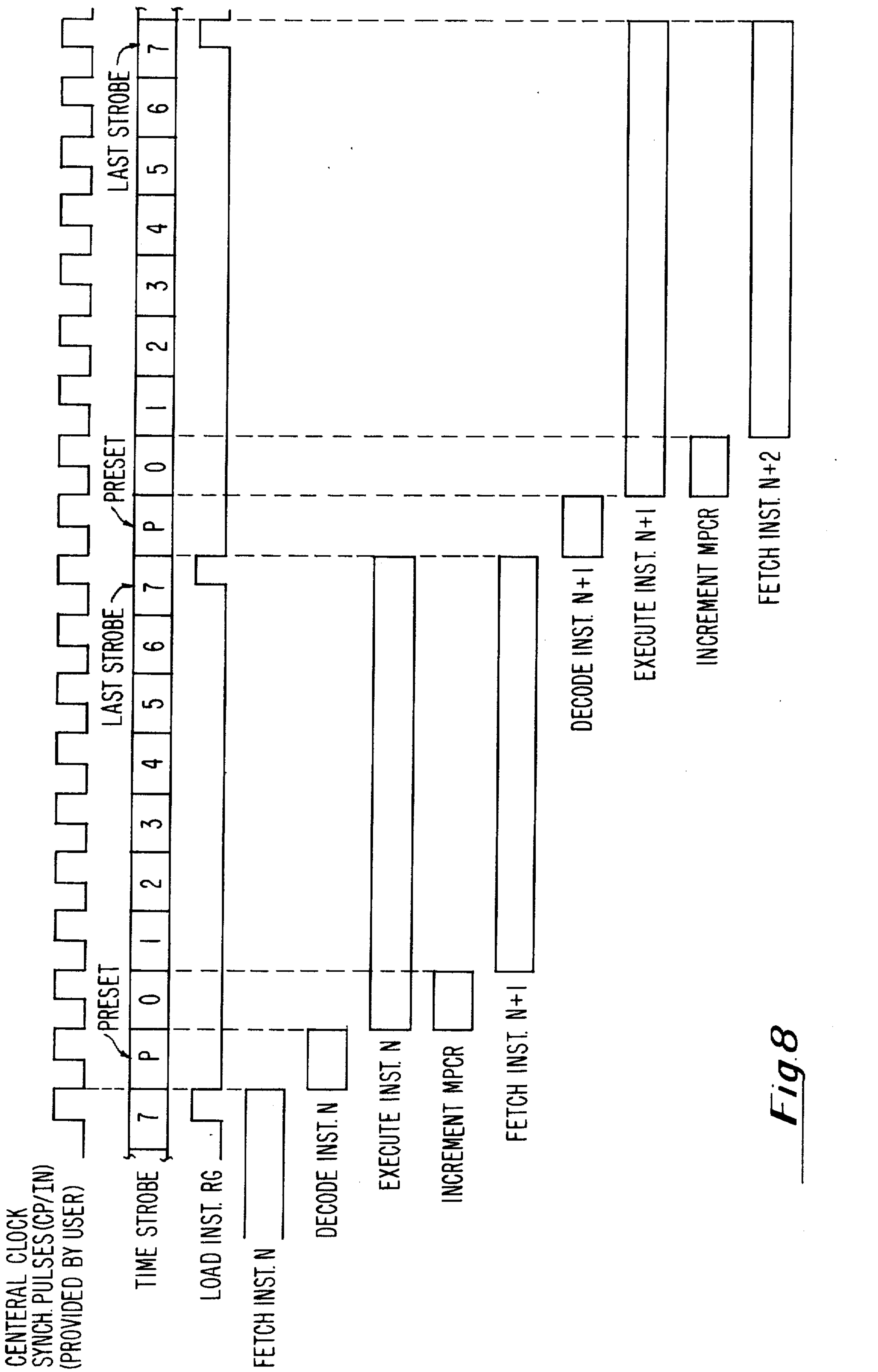
FIG. 8 is a timing diagram for a logic unit or LIT TO DEVICE instruction.
Figure 9:
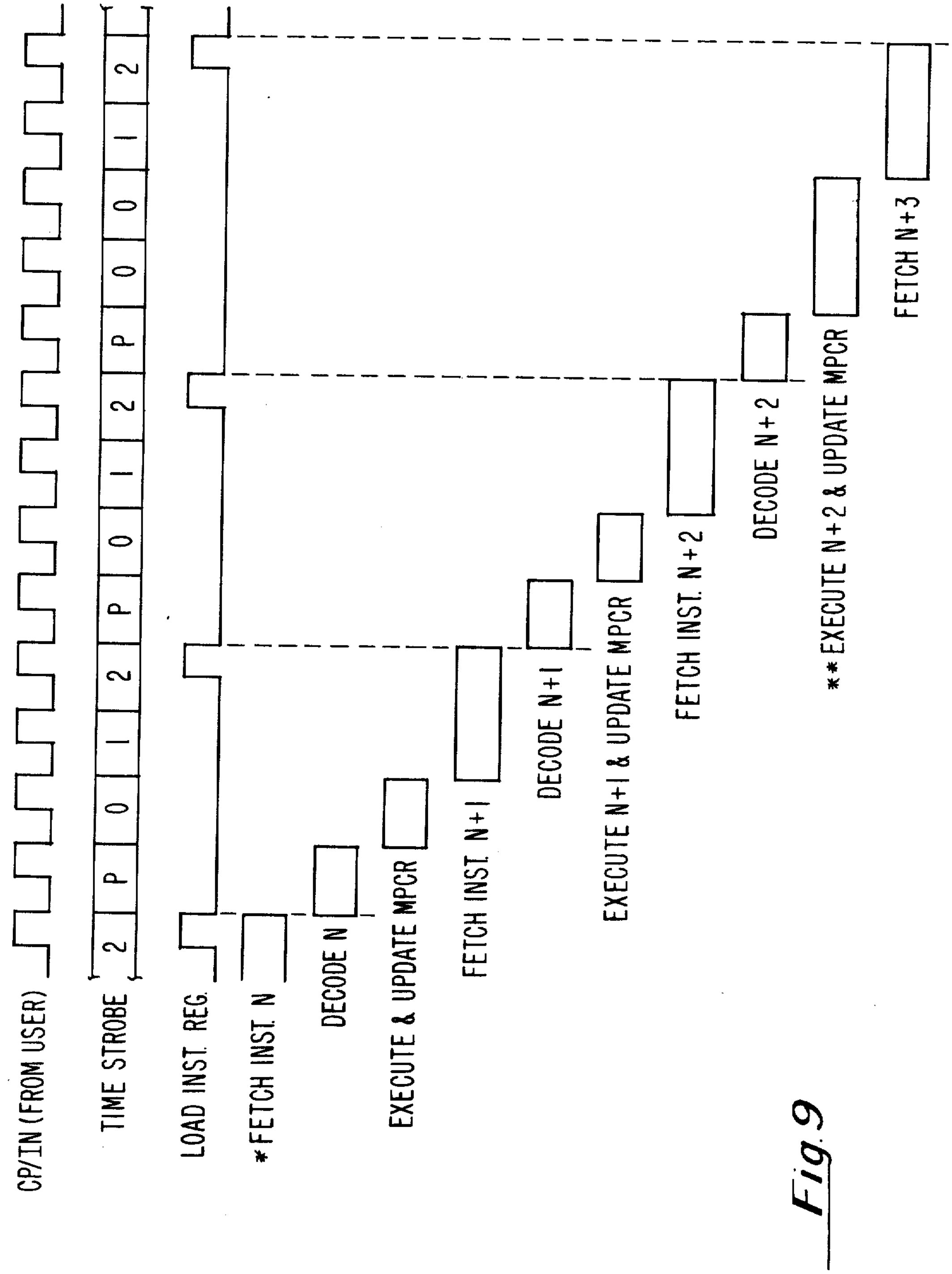
FIG. 9 is a timing diagram for instructions other than LIT TO DEVICE or LUOPS.

FIGS. 8, 9 and 10 illustrate typical timing sequences for various instructions. Basically there are two types of instructions: those which are performed serially (Type I) and those which are performed in parallel (Type II). Type I instructions include logic unit 13 operations and LITERAL-TO-DEVICE operations; all other instructions are Type II.

Type I instructions require nine clock periods for completion. Type II instructions require three clock periods for decoding and execution plus as many additional clock pulses as are required to fetch the next instruction. In a Type I instruction the fetch time of the next instruction is overlapped by the serial execution time of the current instruction.

FIG. 8 illustrates the timing for logic unit 13 or execution of LITERAL-TO-DEVICE instructions. At time-strobe 7 and clock (CPIN), the previous instruction is completed and the new instruction is simultaneously loaded into the instruction register. The interval of time-strobe "P" (preset) is used to decode the contents of the instruction register in preparation for execution during time strobes 0 through 7. An updating of the program counter (MPCR 45) is accomplished by the leading edge of preset-strobe. Preset strobe also increments (STEP) logic unit 13 for LIT-TO-DEVICE instructions.

In single instruction mode, the processor will perform one instruction each time the "run" is pulsed. The instruction being performed in suspended in the last clock period of its execution. Upon reception of the next "run" pulse the instruction held in suspension is completed. A new instruction is loaded into the instruction register, and that instruction is performed up to the final clock where it is then held in suspension awaiting the next "run" pulse.

FIG. 9 illustrates the timing for instructions other than literals to devices or program loops. Execution time needed for these instructions is much less than a nine clock pulse processor operating period. Note that the fetch time marked by a single asterisk (*) in this FIG. 9 is shown as two clock periods long. The number of clocks actually required is a function of clock frequency and memory access time. The fetch time is presettable (manually or by logic gating) from 1 to 8 clock periods.

The double asterisk (**) denotes a special case instruction where additional time is required to update MPCR 45. This additional time (1 clock) is acquired by suspending time strobe zero (TSBO) to span two clocks instead of one.

FIG. 10 illustrates the timing analysis for a single instruction mode and shows central processor output for the execution of the short instructions and the long instructions discussed above.

Processor operations are carried out by the sequential execution of microinstructions. Each microinstruction is read from the program memory 15 on the instruction cycle preceding its execution. The execution of each instruction is begun by loading that instruction into the instruction register 49. In the next clock period (preset strobe) the newly loaded instruction is decoded. The succeeding clock periods of the instruction cycle will then be used to execute the decoded instruction. Upon completion of the execution portion the next instruction will be loaded into the instruction register and the sequence described above is repeated. FIG. 11 defines the instruction set of the improved processor.

Each instruction (FIG. 11( is broken up into bit fields. Bits 1 through 8 represent a binary number (literal) to be loaded into the register as specified by the decoding. Bits 9 through 12 of the literal instruction are used to decode the functional operation of the instruction. More specifically, bits 1 and 2 define the X select (adder 31, input 35). Bits 3 to 6 define the operation to be performed and the Y select (adder 31, input 37). Bits 7 to 10 define the destination select. Bits 11 and 12 define the command code or operator code.

Of the two command code bits, bit 11 defines the instruction length and is decoded to operate fetch time adjustment as will be discussed below.

FIG. 12 is a detailed presentation of the processor instruction set wherein: LIT-TO-DEVICE instructions (DEVO, 1, 2, 3) occupy the first 8-bit field. The purpose of these instructions is to transfer the literal portion of the instruction to a particular register in the users logic. A literal-to-device instruction is decoded when instruction bits 11 and 12 are both zero. Further decoding (that of DEVO, 1, 2, or 3) is defined by instruction bits 9 and 10. These bits are decoded by the user to specify the particular register to be loaded.

The LIT-TO-B (literal to B-register) instruction is decoded when bits 9 through 12 equal binary 1011 respectively. This will result in instruction register 49, bits 1 to 8 to be parallel transferred into the B register 29. MPCR 45 is incremented and the instruction is complete.

The LIT-TO-IR (literal to instruction register) instruction must precede the CALL or GO-TO instruction if the AMPCR 47 and MPCR 45 are greater than 8 bits wide. The LIT-TO-IR instruction is used to load the most significant byte of the GO-TO or CALL address into the instruction register 49 for temporary storage while the CALL or GO-TO instruction containing the least significant address byte is fetched. The CALL or GO-TO instruction will load only into bits 9 through 12 of the instruction register 49, thus leaving instruction register 49, bits 1 through 8 (most significant address byte) unchanged and thereby permitting the concatenation of instruction register bits 11 through 8 with memory 15 output bits 1 through 8 to make up a 16-bit CALL or GO-TO address.

A GO-TO instruction of greater than 8 bits is accomplished by two successive instructions namely: (1) LIT-TO-IR and (2) GO-TO. The address bytes of the two instructions are concatenated and placed 16 bits parallel into the MPCR 45. The contents of AMPCR 47 are not changed.

A LUOP instruction is decoded when instruction register bits 11 and 12 are a binary 0 and 1 respectively. A LUOP will always result in a STEP (MPCR 45 increment); no other successor is possible.

The logic unit 13 instruction specifies the adder 31 inputs, the operation, and the destination specifications for the adder 31. The X-select to the input of the adder is either none or one of the three A-registers (specified by Bits 1, 2). The operation and Y-select to the input of the adder are specified by bits 3, 4, 5 and 6 and includes both arithmetic and logic operations on both the AMPCR 47 and B-register 29 as indicated. The destinations of the adder 31 output as shown are specified by bits 7, 8, 9 and 10. The output of the adder 31 can go to registers 23, 25, 27, or 29. The adder 31 output always goes to the external interface 21 when a logic operation is selected. But if any "OUT" is selected as a destination, a special 4-bit code is generated on the external control lines to enable gating from the adder to the particular external register. Of course, this is true only if the external interface 21 is designed to perform this function. Note that if any of the " BEX" destinations are selected, a 4-bit selection code is sent out on the external control lines, thus enabling a 8-bit serial transfer from the selected external register to the B-register to take place in parallel with the adder output into the specified register (i.e., A1 23, A2 25, A3 27, B29). If the destination register is "B BEX", then an "or" of the adder output and the external input is performed. Normally, the adder output in this case would be set to transfer zeros from the adder, thereby allowing a simple external load of the B-register 29.

As noted by "*", if the AMPCR 47 is not selected as the destination register, then the four operations using AMPCR 47 as a Y-select will have "zero" for a Y-input. This means operations using AMPCR 47 as a Y-select can only be transferred back to AMPCR 47 or A3 27, through the use of this feature "O", "O-NOT", "X", and "X-NOT" can be transferred to any destination register except the AMPCR.

The destinations with "S" (for SHIFT) allow the destinations to be shifted right end-off by one bit, and the most significant bit is supplied by the adder operating on the least significant bit of the "X" and "Y" selected operands. It should be noted that the adder 31 operation is performed on all 8 bits of the input operands; the adder 31 condition bits (LST, MST, ABT, AOV) are set accordingly.

If one wishes to perform a right shifts (endoff) of one bit on the "B" destination, then select (X="O", "X+B", "B S") for the instruction (see the command code FIG. 11). The primary purpose of the shift of the destination is to achieve right and circular shifts on A1, A2, an B, but all other allowed functions are valid into the destinations's most significant bit. If the (X="Al", "X+B", "Al S") instruction is used, the addition takes place on bit 8 of both "A" and "B", and the resulting bit is placed into bit 1 (most significant bit) of Al; thereafter, bit 7 (LSB+1) of Al is added to all bits of "B", and the side effects on the adder condition bits result accordingly. The last noteworthy side effect of a serial implementation of the adder is that the adder overflow (AOV) condition is actually the initial and intermediate carry flip-flop for the serial adder. As such, whenever a "+1" operation is called for, the initial carry is set. In fact, the initial carry is set whenever bit 6 of the operation and Y-select field is zero. However, the initial carry flip-flop is enabled for intermediate carries only on arithmetic functions. For example, on an "X or B" operation, bit 6 is zero. Therefore, "AOV" is set and remains set until a subsequent logic unit operation changes it.

As discussed above, the parent processor has a fixed length period for instruction implementation. Every instruction within the parent processor takes nine clock pulses to implement. However, in reality only arithmetic instructions need the full nine pulses to implemented. Other instructions, especially those which read other memory locations take much less time. The instant invention, therefore, provides a method and apparatus for reducing the implementation period for non-arithmetic instructions. This reduction could be static or dynamic.

In the static case there would be a single, fixed, reduction in the implementation period for non-arithmetic instructions. For a particular machine this would be a function of memory 15 access time and may be adjusted from one to eight clock pulses per period by hard-wire resoldering of control unit 19 or by the operation of automatic selection logic added to unit 19. For such a single reduced-implementation period, the period length would equal the longest non-arithmetic instruction in the processor.

The above mentioned automatic selection logic could be expanded to include a plurality of shorter implementation periods of varying time-length.

To control the logic or period selection, pre-designated code bits are included as part of each instruction. In the instant invention, bit 11, previously designated as part of the command code, is an indicator or flag bit defining non-arithmetic word. When N11 = 1 the pulse count for the implementation period is truncated to a smaller value.

The invention may be implemented by a number of equivalent circuits. A preferred mechanization is discussed below in connection with the description of FIGS. 13, 14 and 15. The features of the invention will readily become apparent from this discussion of the detailed circuitry.

Figure 13:
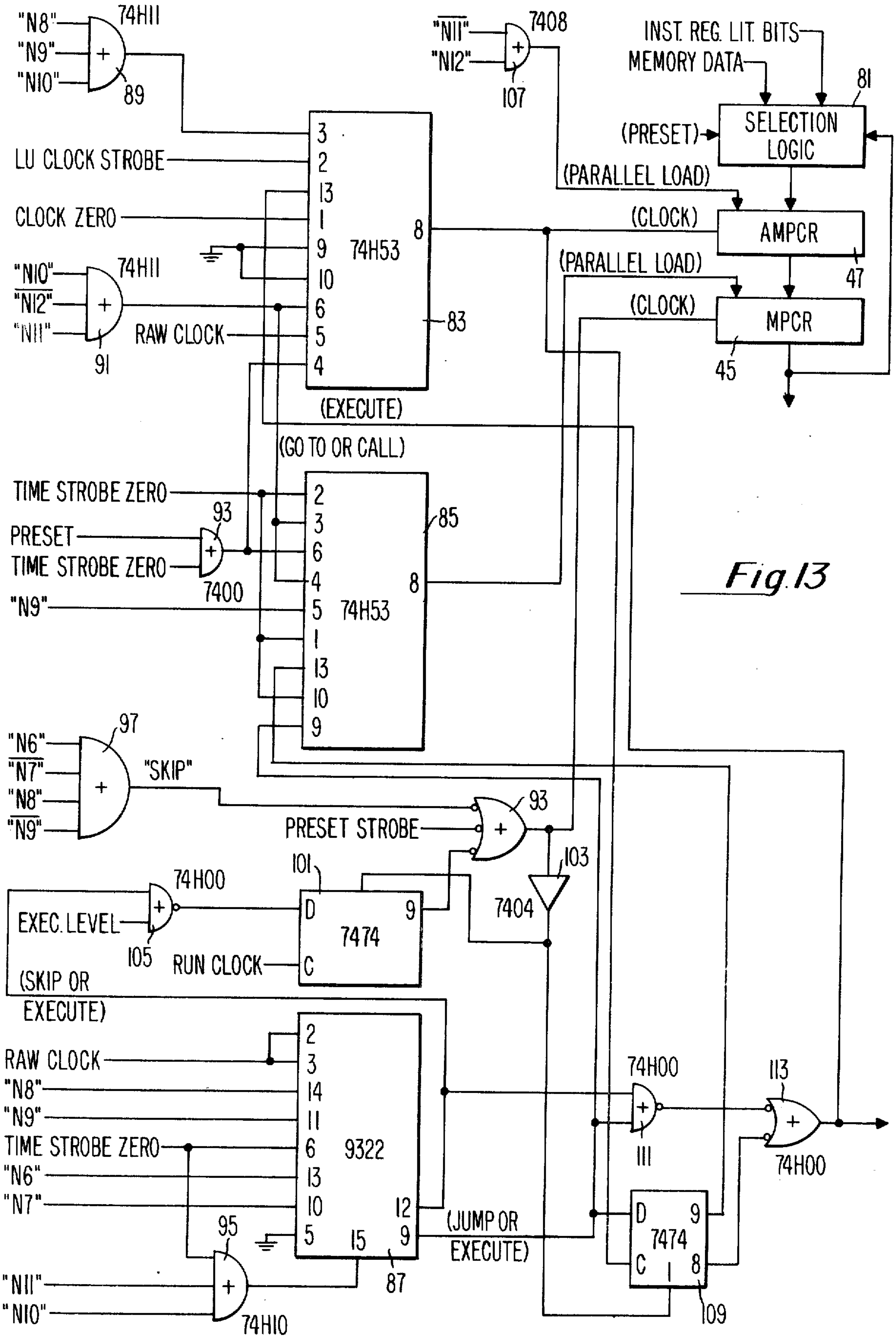
FIG. 13 is a schematic diagram of the logic to implement the new program instructions.

FIG. 13 is a schematic of the control logic effecting programmatic transfers of information in micromemory addressing. Processor timing generator 77 provides basic clocking signals for the circuit. These signals exist in the parent processor and include a "raw clock" signal supplied from the base oscillator. Also included in timing generator 77 are ordinary pulse count logic circuits for providing "time strobe zero", "clock zero", "execute level" (or execute present) and "run clock" pulses. Other input signals to the circuit of FIG. 13 are obtained from other units in the system, i.e., LU 13, memory 15, or instruction register 49 or from new circuitry to be discussed below.

Three Fairchild type 74H53 and-or-invert components 83 and 85 respectively and a Fairchild type 9322 data selection component 87 form the heart of the logic. The output of and-or-invert (AOI) 83, pin 8, is connected to the clock input of AMPCR 47. The output pin 8, of AOI 85 is connected to the parallel load enable of MPCR 45. Tied to pin 3 of AOI 83 is the output of 3 input and-gate 89. Gate 89 has its three inputs tied to the 8th, 9th and 10th bits of instruction register (IR) 49, respectively.

A three input and-gate 91 with its three inputs tied to the 10th, 11th and 12th converse bits of IR 49 has its output tied to AOI 83, pin 6, and AOI 85, pins 3 and 4.

A two input nand-gate 93, having its inputs from the time zero strobe and the present pulse, respectively, has its output connected to AOI 83, pin 4, and AOI 85, pin 6.

AOI 83 has input 2 connected to the Logic Unit 13 clock strobe, input pin 1 connected to the clock zero pulse, input pin 5 connected to the raw clock (system clock) and pins 9 and 10 connected to ground.

AOI 85 has inputs, pins 1, 2 and 10 connected to the time strobe zero, and pin 5 connected to the 9th bit of IR 49.

Data select 87 has input pins, pins 2 and 3 connected to the raw clock, pin 5 grounded, pin 6 connected to the time strobe zero pulse, pin 10 connected to the 7th bit of IR 47, pin 13 connected to the 6th bit of IR 47, pin 13 connected to the 9th bit of IR 47 and pin 14 connected to the 8th bit of IR 47.

The output of a three input and-gate 93 connects to pin 15 of data select 87. Connected to the inputs of and-gate 95 are the 10th and 11th bits of IR 49 and the time strobe zero pulse.

A four input and-gate 97 has input connected to the 6th and 8th bits of IR 49 and the converse of the 7th and 9th bits of IR 49. The output of gate 97 feeds the input of three input nand-gate 99. A second input to nand-gate 99 is connected to the preset strobe while the third input to nand-gate 99 connects from the output (Q or true output) of a D-type latching flip-flop 101. The output of gate 99 clocks MPCR 45.

The D-type fip-flop 101 is reset by the output of nand gate 99 via an inverter 103. Flip-flop 101 is clocked by system raw clock and is input from data select 87, pin 12, via and-gate 105, with gate 105 being enabled by the execute level signal.

AMPCR 47 is parallel-load enabled by the output signal from an and-gate 107. Gate 107 is a twoinput and-gate with its inputs connected to the IR 49 bit 11, converse, and true bit 12 respectively.

The output pin 9 of data select 87 is connected to the input of D-type flip-flop 109, to one input of two input and nand-gate 111 and to pin 9 of AOI 85. The other input to gate 111 is fed from pin 12 of data select 87.

Gate 111 feeds an input of two-input nand-gate 113. The other input of gate 113 is enabled by the $\overline{Q}$ (converse) output of flip-flop 109.

Flip-flop 109 is reset by the output of nandgate 99 via inverter 103 and is clocked by the output from pin 2 of AOI 83.

The output of nand gate 113 is connected to input pin 13 of AOI 83.

The preset signal drives AMPCR 47 to select information coming from MPCR 45 for loading into AMPCR 47.

Figure 14:
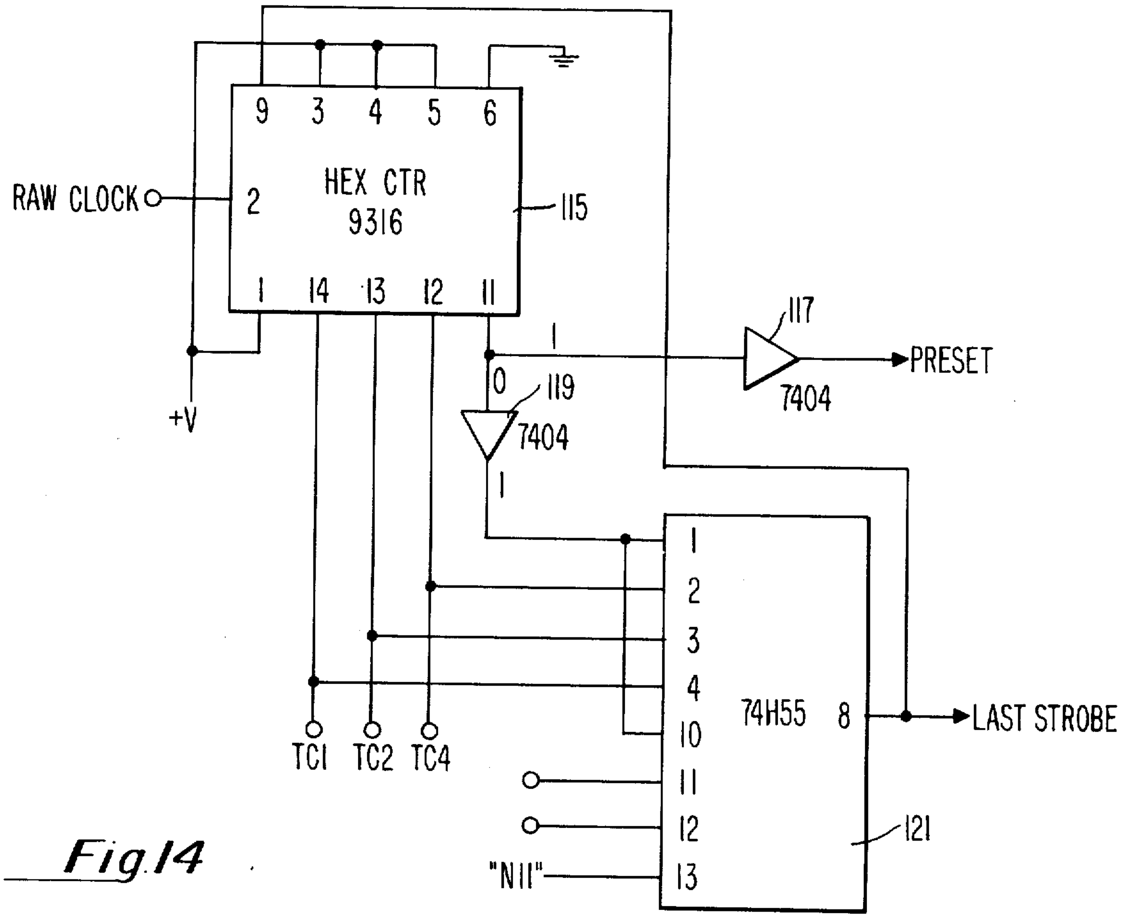
FIG. 14 is a schematic diagram of the circuitry affecting instruction process time.

FIG. 14 is a schematic of the logic for adjusting operator implementation periods. Hexadecimal counter 115, a Fairchild type 9316, is driven on pin 2 by (system) raw clock to generate a cyclic count. Pins 1, 3, 4 and 5 of counter 115 are tied to plus voltage. The four bit output of counter 115 appears on pins 11, 12, 13 and 14. The signal on pin 11 of counter 115 is the preset pulse, having been inverted via inverter 117, which is sent to the circuitry of FIG. 13. Pin 11 of counter 115 is also connected via inverter 119 to pins 1 and 10 of dual four input and-or-invert component (AOI) 121.

AOI 121 is of the Fairchild type 74H55 and has its pin 2 connected to pin 12 of counter 115, its pin 3 connected to pin 13 of counter 115 and its pin 4, connected to pin 14 of counter 115. The output of AOI 121, pin 8, is the "last strobe" which is fed to other parts of the processor as well as to the parallel entry, pin 9, of counter 115 where, in this latter case, it is used to preset the initial count of each instruction period.

Temporary connectors in the form of solid wire clips, may be attached to the pins 12, 13 and 14 of counter 115 for making hard wire interconnections with pins 11 and 12 of AOI 121. When an enable signal appears on pin 13 of AOI 121, which is connected to the 11th bit of IR 49, a truncated count will generate the last strobe output signal so that a short instruction may be processed in a shorter period of time. The "enable count" will depend upon the interconnections between counter 115, pins 12, 13, 14 and AOI 121, pins 11, 12 and will occur according to the following relationship.

| Counter 115 | | AOI 121 | Last strobe at pulse number |
|---|---|---|---|
| Pin 14 | connected to | Pins 11, 12 | 1 |
| Pin 13 | connected to | Pins 11, 12 | 2 |
| Pin 13 | | Pin 11 | |
| Pin 14 | connected to | Pin 12 | 3 |
| Pin 12 | connected to | Pins 11, 12 | 4 |
| Pin 12 | | Pin 11 | |
| Pin 14 | connected to | Pin 12 | 5 |
| Pin 12 | | Pin 11 | |
| Pin 13 | connected to | Pin 12 | 6 |

Figure 15:
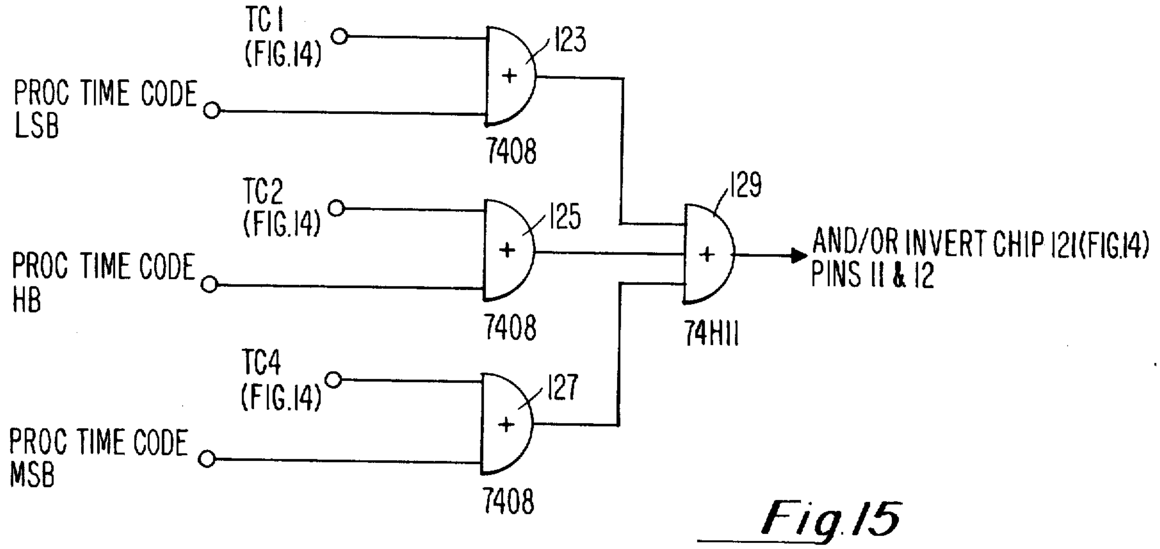
FIG. 15 is a logic diagram of the circuitry which may be added to the process time circuitry of FIG. 14 to automatically change instruction process times.

As an alternative, a three bit code may be entered which defines the access or implementation time to drive automatic selection logic connected to AOI 121. This code may be entered into a logic selection circuit as shown in FIG. 15. Three, two-input and-gates 123, 125, and 127 receive an input from the input code register with the least significant bit connected to a gate 123 input, the middle bit connected to a gate 125 input, and the most significant bit connected to a gate 127 input. The other input of gates 123, 125, 127 are connected to pins 14, 13, 12 respectively of counter 115.

The outputs of gates 123, 125, 127 are each connected to an input of three-input and-gate 129, and the output of and-gate 129 is connected to both pins 11 and 12 of AOI 121.

It is intended that all matter contained herein be interpreted as illustrative and not be taken in the limiting sense, for many different embodiments of this invention could be made without departing from the scope thereof.

What is claimed is:

1. In a microprocessing apparatus for cyclically processing microinstructions addressably stored in a microprogram memory means, certain ones of said microinstructions including address bits, the improvement comprising:

an incrementable first register for storing address bits to addressably select microinstructions for retrieval from said microprogram memory means;

a second register for storing address bits loadable into said first register;

means, responsive to address bits stored in said first register and operative during a single process cycle, for retrieving from said microprogram memory means a selected one of said certain ones of said microinstructions and loading the address bits included therein into said second register;

means for incrementing within said single process cycle the contents of said first register; and means for swapping within said single process cycle said incremented contents of said first register and said loaded address bits in said second register.

2. In a microprocessing apparatus for cyclically processing microinstructions addressably stored in a microprogram memory means, certain ones of said microinstructions including address bits, the improvement comprising:

an incrementable first register for storing address bits to addressably select microinstructions for retrieval from said microprogram memory means;

a second register for storing address bits loadable into said first register;

first means, responsive to address bits stored in said first register and operative during a single process cycle, for retrieving from said microprogram memory means a selected one of said certain ones of said microinstructions and loading the address bits included therein into said second register;

second means, concurrently operative with said first means, for transferring to said first register the address bits stored in said second register immediately preceding the loading thereof by said first means; and third means, operative within said single cycle following the operations of said first and said second means, for swapping the contents of said first and said second registers.

3. In a microprocessing apparatus for cyclically processing microinstructions addressably stored in a microprogram memory means, certain ones of said microinstructions including address bits, the improvement comprising:

an incrementable first register for storing address bits to addressably select microinstructions for retrieval from said microprogram memory means;

a second register for storing address bits loadable into said first register;

first activatable means for incrementing said first register;

second activatable means for swapping the contents of said first and second registers;

third activatable means for executing the microprogram memory means microinstruction selected by the address bits stored in said first register; and means for activating sequentially within two process cycles said first means, said second means, said third means, and again said first means, and said second means.

4. In a microprocessing apparatus for cyclically processing microinstructions addressably stored in a microprogram memory means, certain ones of said microinstructions requiring a relatively short process cycle for implementation, each of said certain ones including coded identifying information, the improvement comprising:

means for generating a periodic process cycle for sequencing the cyclical processing of said microinstructions, the process cycle being sufficient in duration for processing each microinstruction stored in said microprogram memory means;

activatable short cycle means interacting with said generating means for producing a relatively short process cycle, said relatively short process cycle being sufficient in duration for the processing of each of said certain ones of said microinstructions; and means for decoding said identifying information of each of said certain ones of said microinstructions immediately preceding the processing thereof and for activating said short cycle means upon said decoding of said identifying information.

5. The apparatus of claim 4 wherein said relatively short process cycle is presettable in duration.

* * * * *